(12) United States Patent
Garmon et al.

(10) Patent No.: US 11,809,675 B2
(45) Date of Patent: Nov. 7, 2023

(54) USER INTERFACE NAVIGATION METHOD FOR EVENT-RELATED VIDEO

(71) Applicant: CARRIER CORPORATION, Palm Beach Gardens, FL (US)

(72) Inventors: Richard Garmon, Mystic, CT (US); Clifford Cox, Flower Mound, TX (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/184,723

(22) Filed: Mar. 16, 2023

(65) Prior Publication Data
US 2023/0297207 A1  Sep. 21, 2023

Related U.S. Application Data

(60) Provisional application No. 63/321,495, filed on Mar. 18, 2022.

(51) Int. Cl.
*G06F 3/04845* (2022.01)
*G06F 3/0481* (2022.01)

(52) U.S. Cl.
CPC ........ *G06F 3/0481* (2013.01); *G06F 3/04845* (2013.01)

(58) Field of Classification Search
None
See application file for complete search history.

(56) References Cited

U.S. PATENT DOCUMENTS

| 7,194,701 B2 | 3/2007 | Stavely et al. |
| 7,562,299 B2 | 7/2009 | Millar et al. |
| 7,594,177 B2 | 9/2009 | Jojic et al. |
| 7,791,466 B2 | 9/2010 | Agarwalla et al. |
| 7,797,713 B2 | 9/2010 | Agarwalla et al. |
| 7,843,491 B2 | 11/2010 | Vallone et al. |
| 8,174,572 B2 | 5/2012 | Buehler et al. |
| 8,346,056 B2 | 1/2013 | M |
| 8,365,235 B2 | 1/2013 | Hunt et al. |

(Continued)

FOREIGN PATENT DOCUMENTS

| EP | 1777959 A1 | 4/2007 |
| GB | 2572007 A | 9/2019 |

(Continued)

OTHER PUBLICATIONS

European Search Report for 23162673.0, dated Aug. 22, 2023, 9 Pages.

*Primary Examiner* — Rinna Yi
(74) *Attorney, Agent, or Firm* — CANTOR COLBURN LLP (57) ABSTRACT

A method for analyzing and displaying surveillance video including: capturing, using a first video camera, a first plurality of video frames of a first area at a first time; analyzing the first plurality of video frames or linking to one or more alarms received; determining a first activity of interest within one or more first video frames of the first plurality of video frames; generating a first activity of interest video clip from the one or more first video frames; and displaying the first activity of interest video clip within a first carousel on a display device, wherein the first activity of interest video clip is configured to rotate around a first axis within the first carousel on the display device.

16 Claims, 2 Drawing Sheets

(56) References Cited

U.S. PATENT DOCUMENTS

| | | |
|---|---|---|
| 8,390,684 B2 | 3/2013 | Piran et al. |
| 8,413,054 B2 | 4/2013 | Kaplan et al. |
| 8,601,494 B2 | 12/2013 | Brown et al. |
| 8,797,404 B2 | 8/2014 | Joseph et al. |
| 8,875,023 B2 | 10/2014 | Cronin et al. |
| 9,123,385 B2 | 9/2015 | Isozu et al. |
| 9,134,874 B2 | 9/2015 | Ahuja et al. |
| 9,269,243 B2 | 2/2016 | Shet et al. |
| 9,363,579 B2 | 6/2016 | Frumar et al. |
| 9,804,760 B2 | 10/2017 | Cunningham et al. |
| 9,870,684 B2 | 1/2018 | Wang et al. |
| 9,967,524 B2 | 5/2018 | Brunet et al. |
| 9,990,120 B2 | 6/2018 | Gottschlag et al. |
| 9,998,775 B2 | 6/2018 | Tarbox et al. |
| 10,120,536 B2 | 11/2018 | Cha et al. |
| 10,219,026 B2 | 2/2019 | Eim et al. |
| D843,398 S | 3/2019 | Stewart et al. |
| 10,276,007 B2 | 4/2019 | Takahashi et al. |
| 10,296,194 B2 | 5/2019 | McLean et al. |
| 10,423,320 B2 | 9/2019 | Williams et al. |
| 10,440,076 B2 | 10/2019 | Casey et al. |
| 10,572,738 B2 | 2/2020 | Leizerovich et al. |
| 10,820,058 B2 | 10/2020 | Carrigan et al. |
| 10,860,857 B2 | 12/2020 | Hu et al. |
| 11,030,463 B2 | 6/2021 | Miyake et al. |
| 11,140,306 B2 | 6/2021 | Miyake et al. |
| 11,184,675 B1 | 11/2021 | Aher et al. |
| 11,204,687 B2 | 12/2021 | Cueto |
| 2001/0028369 A1* | 10/2001 | Gallo .................. G06F 3/04815 715/848 |
| 2006/0221184 A1* | 10/2006 | Vallone ............ G08B 13/19682 348/143 |
| 2006/0239645 A1 | 10/2006 | Curtner et al. |
| 2007/0101364 A1* | 5/2007 | Morita .................. H04N 21/47 725/38 |
| 2010/0002070 A1* | 1/2010 | Ahiska .................. H04N 23/81 348/E7.001 |
| 2010/0175022 A1* | 7/2010 | Diehl .................... G06F 3/0481 715/764 |
| 2011/0159956 A1* | 6/2011 | Itskov ................. A63F 13/2145 463/31 |
| 2011/0161818 A1 | 6/2011 | Viljamaa |
| 2013/0039634 A1* | 2/2013 | M .................... G08B 13/19682 386/230 |
| 2013/0185642 A1* | 7/2013 | Gammons ........... G06F 3/04817 715/765 |
| 2014/0333776 A1* | 11/2014 | Dedeoglu ........ H04N 21/44008 348/159 |
| 2017/0270365 A1 | 9/2017 | Laska et al. |
| 2017/0339336 A1 | 11/2017 | Daliyot |
| 2019/0132512 A1* | 5/2019 | Jones ...................... H04N 5/33 |
| 2020/0099987 A1 | 3/2020 | Petrillo et al. |
| 2020/0404222 A1 | 12/2020 | Hirasawa et al. |

FOREIGN PATENT DOCUMENTS

| | | |
|---|---|---|
| KR | 102099239 B1 | 5/2020 |
| WO | 2014182898 A1 | 11/2014 |

\* cited by examiner

USER INTERFACE NAVIGATION METHOD FOR EVENT-RELATED VIDEO

CROSS-REFERENCE TO RELATED APPLICATIONS

This application claims the benefit of U.S. Provisional Application No. 63/321,495, filed Mar. 18, 2022, all of which are incorporated herein by reference in their entirety.

BACKGROUND

The embodiments herein generally relate to surveillance camera video, and, more specifically, to a method and apparatus for displaying the video captured by the surveillance cameras.

Video captured by surveillance cameras is conventionally displayed in a grid that depicts the view from multiple surveillance cameras simultaneously. This allows a security guard to monitor all the views simultaneously. However, the grid method becomes increasingly more difficult as more and more surveillance cameras get added. For example, as more cameras get added the individual grids for each surveillance camera may need to shrink and there may just be too many surveillance cameras for one security guard to monitor. Accordingly, there is a need for a more efficient solution.

BRIEF SUMMARY

According to one embodiment, a method for analyzing and displaying surveillance video is provided. The method including: capturing, using a first video camera, a first plurality of video frames of a first area at a first time; analyzing the first plurality of video frames or linking to one or more alarms received; determining a first activity of interest within one or more first video frames of the first plurality of video frames; generating a first activity of interest video clip from the one or more first video frames; and displaying the first activity of interest video clip within a first carousel on a display device, wherein the first activity of interest video clip is configured to rotate around a first axis within the first carousel on the display device.

In addition to one or more of the features described above, or as an alternative, further embodiments may include: generating a first thumbnail associated with the first activity of interest video clip; and displaying the first activity of interest video clip within the first carousel as the first thumbnail on the display device.

In addition to one or more of the features described above, or as an alternative, further embodiments may include: receiving a play manual input from an input device indicating to play the first activity of interest video clip; and playing the first activity of interest video clip on the display device in response to the play manual input In addition to one or more of the features described above, or as an alternative, further embodiments may include: receiving a rotate manual input from an input device to rotate the first thumbnail to a rough center of the display device; rotating the first thumbnail to the rough center of the display device in response to the rotate manual input; and playing the first activity of interest video clip on the display device in response to the rotate manual input.

In addition to one or more of the features described above, or as an alternative, further embodiments may include that the first axis is a vertical axis.

In addition to one or more of the features described above, or as an alternative, further embodiments may include: capturing, using a second video camera, a second plurality of video frames of at least a portion of the first area at the first time; analyzing the second plurality of video frames or linking to one or more second alarms received; determining that the first activity of interest is within one or more second video frames of the second plurality of video frames; generating a second activity of interest video clip from the one or more second video frames; and displaying the second activity of interest video clip within a second carousel on the display device, wherein the second activity of interest video clip is configured to rotate around a second axis within the second carousel on the display device.

In addition to one or more of the features described above, or as an alternative, further embodiments may include that the second axis is a horizontal axis.

In addition to one or more of the features described above, or as an alternative, further embodiments may include that the first axis is a vertical axis and the second axis is a horizontal axis perpendicular to the first axis.

In addition to one or more of the features described above, or as an alternative, further embodiments may include: capturing, using the first video camera, a second plurality of video frames of the first area at a second time; analyzing the second plurality of video frames or linking to one or more second alarms received; determining a second activity of interest within one or more second video frames of the second plurality of video frames; generating a second activity of interest video clip from the one or more second video frames; and displaying the second activity of interest video clip within the first carousel on the display device, wherein the second activity of interest video clip is configured to rotate around the first axis within the first carousel on the display device.

In addition to one or more of the features described above, or as an alternative, further embodiments may include: capturing, using a second video camera, a second plurality of video frames of the first area at a second time; analyzing the second plurality of video frames or linking to one or more second alarms received; determining a second activity of interest within one or more second video frames of the second plurality of video frames; generating a second activity of interest video clip from the one or more second video frames; and displaying the second activity of interest video clip within the first carousel on the display device, wherein the second activity of interest video clip is configured to rotate around the first axis within the first carousel on the display device.

In addition to one or more of the features described above, or as an alternative, further embodiments may include generating a first thumbnail associated with the first activity of interest video clip; and displaying the first activity of interest video clip within the first carousel as the first thumbnail on the display device; receiving a rotate manual input from an input device to rotate the first thumbnail to a rough center of the display device; rotating the first thumbnail to the rough center of the display device in response to the rotate manual input; and enlarging a size of the first thumbnail as the first thumbnail rotates to the rough center, wherein the size of the first thumbnail is at a maximum at the rough center.

In addition to one or more of the features described above, or as an alternative, further embodiments may include generating a first thumbnail associated with the first activity of interest video clip; displaying the first activity of interest video clip within the first carousel as the first thumbnail on the display device; receiving a rotate manual input from an input device to rotate the first thumbnail away from a rough center of the display device; rotating the first thumbnail away from the rough center of the display device in response to the rotate manual input; and decreasing a size of the first thumbnail as the first thumbnail rotates away from the rough center, wherein the size of the first thumbnail is at a maximum at the rough center.

According to another embodiment, a video management system for analyzing and displaying surveillance video is provided. The video management system including: a processor; and a memory including computer-executable instructions that, when executed by the processor, cause the processor to perform operations. The operations including: capturing, using a first video camera, a first plurality of video frames of a first area at a first time; analyzing the first plurality of video frames or linking to one or more alarms received; determining a first activity of interest within one or more first video frames of the first plurality of video frames; generating a first activity of interest video clip from the one or more first video frames; and displaying the first activity of interest video clip within a first carousel on a display device, wherein the first activity of interest video clip is configured to rotate around a first axis within the first carousel on the display device.

In addition to one or more of the features described above, or as an alternative, further embodiments may include that the operations further include: generating a first thumbnail associated with the first activity of interest video clip; and displaying the first activity of interest video clip within the first carousel as the first thumbnail on the display device.

In addition to one or more of the features described above, or as an alternative, further embodiments may include that the operations further include: receiving a play manual input from an input device indicating to play the first activity of interest video clip; and playing the first activity of interest video clip on the display device in response to the play manual input from the input device indicating to play the first activity of interest video clip.

In addition to one or more of the features described above, or as an alternative, further embodiments may include that the operations further include: receiving a rotate manual input from an input device to rotate the first thumbnail to the rough center of the display device; rotating the first thumbnail to the rough center of the display device in response to the rotate manual input; and playing the first activity of interest video clip on the display device in response to the rotate manual input.

In addition to one or more of the features described above, or as an alternative, further embodiments may include that the first axis is a vertical axis.

In addition to one or more of the features described above, or as an alternative, further embodiments may include that the operations further include: capturing, using a second video camera, a second plurality of video frames of at least a portion of the first area at the first time; analyzing the second plurality of video frames or linking to one or more second alarms received; determining that the first activity of interest is within one or more second video frames of the second plurality of video frames; generating a second activity of interest video clip from the one or more second video frames; and displaying the second activity of interest video clip within a second carousel on the display device, wherein the second activity of interest video clip is configured to rotate around a second axis within the second carousel on the display device.

In addition to one or more of the features described above, or as an alternative, further embodiments may include that the second axis is a horizontal axis.

According to another embodiment, a computer program product tangibly embodied on a non-transitory computer readable medium is provided. The computer program product including instructions that, when executed by a processor, cause the processor to perform operations including: capturing, using a first video camera, a first plurality of video frames of a first area at a first time; analyzing the first plurality of video frames or linking to one or more alarms received; determining a first activity of interest within one or more first video frames of the first plurality of video frames; generating a first activity of interest video clip from the one or more first video frames; and displaying the first activity of interest video clip within a first carousel on a display device, wherein the first activity of interest video clip is configured to rotate around a first axis within the first carousel on the display device.

Technical effects of embodiments of the present disclosure include analyzing surveillance video to determine an activity of interest in the surveillance video and only displaying video clips with an activity of interest in a carousel on a display device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
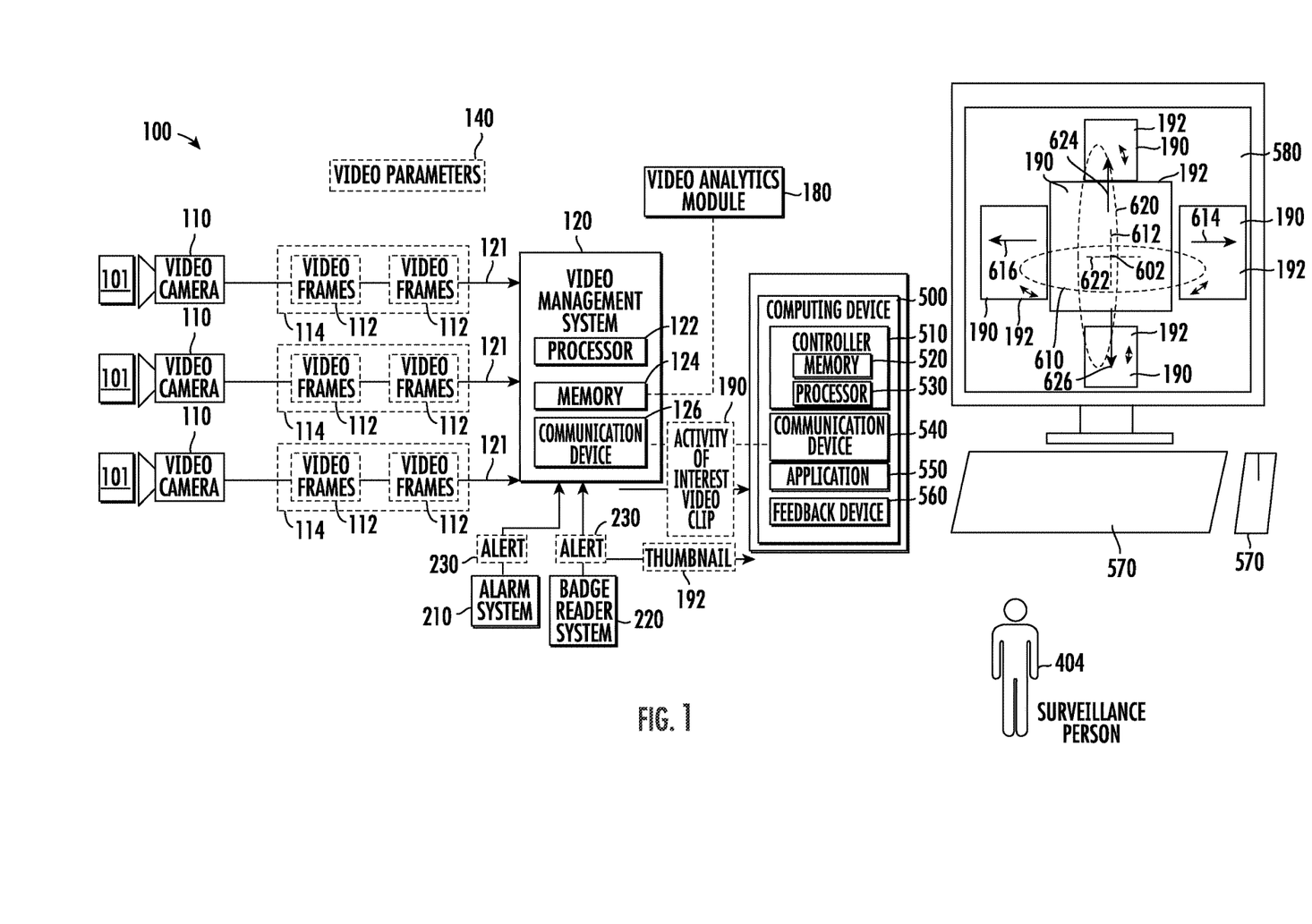
FIG. 1 is a block diagram of an exemplary video surveillance system, according to an embodiment of the present disclosure.

Referring to FIG. 1 a schematic diagram of a video surveillance system 100 is illustrated, according to an embodiment of the present disclosure. It should be appreciated that although particular systems are separately defined in the schematic block diagrams, each or any of the systems may be otherwise combined or separated via hardware and/or software.

The video surveillance system 100 may include one or more video cameras 110, a video management system 120 in electronic communication with each of the one or more video cameras 110, and a computing device 500 in electronic communication with the video management system 120.

The video management system 120 may also be a recorder for the video surveillance system 100. The video management system 120 may be local, remote, or cloud-based relative to the video cameras 110 and the computing device 500.

The video management system 120 may include a processor 122 and an associated memory 124 comprising computer-executable instructions (i.e., computer program product) that, when executed by the processor 122, cause the processor 122 to perform various operations. The processor 122 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 124 may be but is not limited to a random access memory (RAM), read only memory (ROM), or other electronic, optical, magnetic or any other computer readable medium.

The video management system 120 also includes a communication device 126. The communication device 126 may be capable of communication with the video cameras 110 and/or the computing device 500 through wired and/or wireless communications. The communication device 126 may be a software module that handles communications to and from the video cameras 110 or to and from the computing device 500.

The computing device 500 may belong to or be in possession of a surveillance person 404. The surveillance person 404 may be a security person, building manager, or any person in charge of or tasked with monitoring the areas 101 via the video cameras 110.

The computing device 500 may be a desktop computer, a laptop computer, or a mobile computing device that is typically carried by a person, such as, for example a phone, a smart phone, a PDA, a smart watch, a tablet, a laptop, smart glasses, or any other computing device known to one of skill in the art.

The computing device 500 includes a controller 510 configured to control operations of the computing device 500. The controller 510 may be an electronic controller including a processor 530 and an associated memory 520 comprising computer-executable instructions (i.e., computer program product) that, when executed by the processor 530, cause the processor 530 to perform various operations. The processor 530 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 520 may be but is not limited to a random access memory (RAM), read only memory (ROM), or other electronic, optical, magnetic or any other computer readable medium.

It is understood that the computer application 550 may be an application installed on the computing device 500. The computer application 550 may be accessible from computing device 500, such as, for example, a software-as-as service or a website. The computer application 550 may be in communication with the video management system 120 via the internet, a local hardwire network, or a local wireless network.

The computing device 500 includes a communication device 540 configured to communicate one or more wireless or wired signals. The one or more wireless signals may include Wi-Fi, Bluetooth, Zigbee, Sub-GHz RF Channel, cellular, satellite, or any other wireless signal known to one of skill in the art.

The computing device 500 may include a display device 580, such as for example a computer display, an LCD display, an LED display, an OLED display, a touchscreen of a smart phone, tablet, or any other similar display device known to one of the skill in the art. The surveillance person 404 operating the computing device 500 is able to view the computer application 550 through the display device 580. If the computing device 500 is a pair of smart glasses, then the display device 580 may be a transparent lens of the pair of smart glasses.

The computing device 500 includes one or more input device 570 configured to receive a manual input from a user (e.g., human being) of computing device 500. The input device 570 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the computing device 500, or any similar input device known to one of skill in the art. The user operating the computing device 500 may be able to enter data into the computer application 550 through the input device 570. The input device 570 may allow the user operating the computing device 500 to enter data into the computer application 550 via a manual input to input device 570. For example, the user may respond to a prompt on the display device 580 by entering a manual input via the input device 570. In one example, the manual input may be a touch on the touchscreen, a click on a mouse, or a tap on a keyboard button. In an embodiment, the display device 580 and the input device 570 may be combined into a single device, such as, for example, a touchscreen on the smart phone. The computing device 500 of FIG. 1 is illustrated as having a keyboard and a mouse, although it should be appreciated that the computing device 500 may not include a keyboard or a mouse in certain instances.

The computing device 500 may also include a feedback device 560. The feedback device 560 may activate in response to a manual input via the input device 570. The feedback device 560 may be a haptic feedback vibration device and/or a speaker emitting a sound. The feedback device 560 may activate to confirm that the manual input entered via the input device 570 was received via the computer application 550. For example, the feedback device 560 may activate by emitting an audible sound or vibrate the computing device 500 to confirm that the manual input entered via the input device 570 was received via the computer application 550.

Each video camera 110 may be positioned to capture video frames 112 of an area 101. The video cameras 110 may capture video frames 112 of areas 101 that may be the same areas or different areas. The areas 101 of each camera 110 may overlap with areas of other cameras 110 either partially or in full. Thus, if one camera 110 were to fail another camera 110 may be activated to capture video frames 112 of the area 101 where the video camera 110 failed. Each video camera 110 may be adjustable to be repositioned to capture the same area 101 or multiple areas 101. While three video cameras 110 are illustrated, it is understood that the embodiments disclosed herein may be applicable to any number of video cameras 110.

The video surveillance system 100 includes a video analytics module 180. The video analytics module 180 may be installed directly on the video management system 120 or the video camera 110. The video cameras 110 is configured to capture video frames 112 and transmit the video frames 112 to the video management system 120. The video frames 112 from one or more video cameras 110 arrive at the video management system 120 as an incoming stream 121. The video frames 112 may be organized into packets 114 by the video camera 110. The video packets 114 contain information such as, for example, an IP address from where the video packets 114 are coming from, an IP address where to send the video packets 114, a type of the video frame 112, a number of video frames 112, time stamps of each video frame 112 and video parameters 140. The video parameters 140 are statistical information regarding the video frames 112 and/or the video packets 114. The video parameters 140 may include but are not limited to time between video frames 112, time between video packets 114, a sequential number of a video frame 112, and a sequential number of a video packet 114, a group of pictures (GOP) structure, a size of the video packet 114 and a real frame per second (FPS) value. The size of the video packet 114 may be used to calculate frame size and bandwidth The video analytics module 180 may be a software algorithm configured to collect and analyze video frames 112 received at the video management system 120 from the video cameras 110. The video analytics module 180 is configured to collect and analyze the video frames 112 to determine an activity of interest in the video frame. The video analytics module 180 may analyze a single video frame 112 at a time and/or a series of sequential video frames 112 to determine the activity of interest. The video analytics module 180 may utilize self-learning, machine learning, artificial intelligence, neural networks, deep learning, or any other analysis method known to one of skill in the art to determine the activity of interest. An activity of interest may be an event captured by the video camera 110 that may be of interest to the surveillance person 404. The activity of interest may include, but is not limited to, a break-in, a robbery, an assault, a fight, a mugging, a disturbance, a mob, or any similar event that may require security to intervene.

The video analytics module 180 may be configured to compile all of the video frames 112 associated with the activity of interest into an activity of interest video clip 190 that is then transmitted to the computing device 500 for display on the computing device 500. The video analytics module 180 may be configured to determine a single video frame 112 of the video frames 112 within the activity of interest video clip 190 to be used as a thumbnail 192. The thumbnail 192 may be the video frame 112 of the activity of interest video clip 190 that best visually illustrates the activity of interest. The thumbnail 192 may be transmitted to the computing device 500 along with the activity of interest video clip 190.

An activity of interest video clip 190 may be determined from the video frames 112 received from each video camera 110.

Alternatively, the video clips 190 may be linked with alerts 230 received from an alarm system 210 or a badge reader system 220. The alerts 230 may indicate times in the videos frames 112 that may have an activity of interest. For example, the alerts 230 may be badge swipes, access granted or denied, a door forced or held open. In one embodiment, the video analytics module 180 may not be present and only alarms 230 are utilized to determine activities of interest. The alarm system 210 may include one or more physical sensors to detect the activity.

The computer application 550 is configured to organize and display the thumbnails 192 of the activity of interest video clips 190 in a first carousel 610 on the display device 580.

The first carousel 610 may rotate the thumbnails 192 around a first axis 612. The first axis 612 may be a vertical axis, as illustrated in FIG. 1. The surveillance person 404 may rotate the thumbnails 192 around the first axis 612 through a rotate manual input, such as, for example, a click, touch, or swipe, in a first direction 614 or a second direction 616 using the input device 570. The second direction 616 being opposite the first direction 614. The first direction 614 may be right and the second direction 616 may be left or the first direction 614 may be left and the second direction 616 may be right.

The thumbnail 192 may be enlarged as it moves towards a rough center 602 of the display device 580 and may shrink as it moves away from the rough center 602. The thumbnail 192 may reach its maximum size at the rough center 602. The activity of interest video clips 190 may automatically begin playing when the thumbnail 192 reaches the rough center 602. Alternatively, the activity of interest video clips 190 may begin playing when the thumbnail 192 when the surveillance person enters a play manual input, such as, for example, a click or tap on the thumbnails 192 through the input device 570.

The surveillance person 404 may quickly bring a thumbnail 192 to the rough center 602 of the display device 580 by clicking or tapping on a thumbnail 192 that is not currently in the rough center 602 using the input device 570. Additionally, the surveillance person 404 may quickly bring a thumbnail 192 to the rough center 602 of the display device 580 by rotating the thumbnails 192 around the first carousel 610 through a quick click, touch, or swipe, in a first direction 614 or a second direction 616 using the input device 570.

The first carousel 610 may contain a single activity of interest video clip 190 for each activity of interest identified by the video analytics module 180, which advantageously allows the surveillance person to quick review each activity of interest identified. The first carousel 610 may contain only activity of interest video clips 190. In other words, the first carousel 610 may contain only video clips that depict an activity of interest. If a video clip does not contain an activity of interest it will not be added to the first carousel 610, If multiple video cameras 110 have captured the same activity of interest then the activity of interest video clips 190 for the same activity of interest may be organized and displayed in a second carousel 620 on the display device 580. For example, some video cameras 110 may capture the same area 101 and thus may also capture the same activity of interest occurring in that area 101.

The second carousel 620 may rotate the thumbnails 192 relating to the same activity of interest around a second axis 622. The second axis 622 may be a horizontal axis, as illustrated in FIG. 1. The second axis 622 may be about perpendicular to the first axis 612, as illustrated in FIG. 1. The surveillance person 404 may rotate the thumbnails 192 around the second axis 622 through a rotate manual input, such as, for example, a click, touch, or swipe, in a third direction 624 or a fourth direction 626 using the input device 570. The fourth direction 626 being opposite the third direction 624. The third direction 624 may be right and the fourth direction 626 may be left or the third direction 624 may be left and the fourth direction 626 may be right.

Alternatively, the second axis 622 may be vertical and the first axis 612 may be horizontal. This would result in the first direction 614 and the second direction 616 being up or down, and the third direction 624 and the fourth direction 626 being left or right. It is understood that the embodiment disclosed herein are not limited to these orientations of axis 612, 622 and the axis 612, 622 may be oriented in any other relative orientation.

The thumbnail 192 may be enlarged as it moves towards a rough center 602 of the display device 580 and may shrink as it moves away from the rough center 602. The thumbnail 192 may reach its maximum size at the rough center 602. The activity of interest video clips 190 may automatically begin playing when the thumbnail 192 reaches the rough center 602. Alternatively, the activity of interest video clips 190 may begin playing when the thumbnail 192 when the surveillance person enters a play manual input, such as, for example, a click or tap on the thumbnails 192 through the input device 570.

The surveillance person 404 may quickly bring a thumbnail 192 to the rough center 602 of the display device 580 may clicking or tapping on a thumbnail 192 that is not currently in the rough center 602 using the input device 570. Additionally, the surveillance person 404 may quickly bring a thumbnail 192 to the rough center 602 of the display device 580 by rotating the thumbnails 192 around the second carousel 620 through a quick click, touch, or swipe, in a third direction 624 or a fourth direction 626 using the input device 570.

The second carousel 620 may contain multiple activity of interest video clips 190 for the same activity of interest identified by the video analytics module 180, which advantageously allows the surveillance person to quickly review each activity of interest identified from multiple different camera angles. The second carousel 620 may contain only activity of interest video clips 190. In other words, the second carousel 620 may contain only video clips that depict the same activity of interest but from different cameras 110. If a video clip does not contain an activity of interest it will not be added to the second carousel 620.

Figure 2:
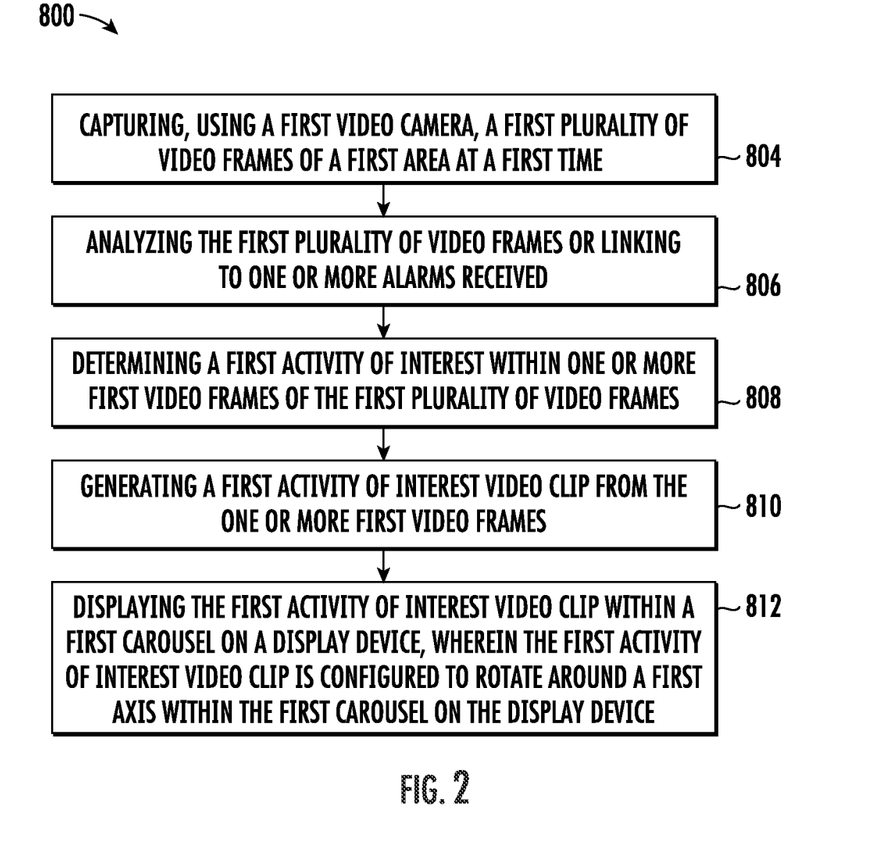
FIG. 2 is a flow diagram illustrating an exemplary method for analyzing and displaying surveillance video, according to an embodiment of the present disclosure.

Referring now to FIG. 2, with continued reference to FIG. 1, a flow diagram illustrating an exemplary computer implemented method 800 for analyzing and displaying surveillance video is illustrated in accordance with an embodiment of the present disclosure. In embodiment, the method 800 may be performed by the video analytics module 180 and/or the application 550.

At block 804, a first video camera 110 captures a first plurality of video frames 112 of a first area 101 at a first time. At block 806, the first plurality of video frames 112 is analyzed or linked to one or more alarms 230 received. At block 808, a first activity of interest within one or more first video frames 112 of the first plurality of video frames 112 is determined. At block 810, a first activity of interest video clip 190 is generated from the one or more first video frames 112.

At block 812, the first activity of interest video clip 190 is displayed within a first carousel 610 on a display device 580. The first activity of interest video clip 190 is configured to rotate around a first axis 612 within the first carousel 610 on the display device 580.

The method 800 may also include that a first thumbnail 192 associated with the first activity of interest video clip 190 is generated and the first activity of interest video clip 190 is displayed within the first carousel 610 as the first thumbnail 192 on a display device 580.

The method 800 may further include that a play manual input is received from the input device 570 indicating to play the first activity of interest video clip 190 and the first activity of interest video clip 190 is played on the display device 580 in response to the play manual input from the input device 570 indicating to play the first activity of interest video clip 190.

The method 800 may yet further include that a rotate manual input is received from the input device 570 to rotate the first thumbnail 192 to the rough center 602 of the display device 580, the first thumbnail 192 is rotated to the rough center 602 of the display device 580 in response to the rotate manual input from the input device 570 to rotate the first thumbnail 192 to the rough center 602 of the display device 580, and the first activity of interest video clip 190 is played on the display device 580 in response to the rotate manual input from the input device 570 to rotate the first thumbnail 192 to the rough center 602 of the display device 580.

The method 800 may yet also include that a second video camera 110 captures a second plurality of video frames 112 of at least a portion of the first area 101 at the first time. The second plurality of video frames 112 is analyzed or one or more second alarms are received, and then it is determined that the first activity of interest is within one or more second video frames 112 of the second plurality of video frames 112. Then a second activity of interest video clip 190 is generated from the one or more second video frames 112 and the second activity of interest video clip 190 is displayed within a second carousel 620 on the display device 580. The second activity of interest video clip 190 is configured to rotate around a second axis 622 within the second carousel 620 on the display device 580.

The method 800 may yet further include that the first video camera 110 captures a second plurality of video frames 112 of the first area 101 at a second time. The second plurality of video frames 112 is analyzed or one or more second alarms are received, and then a second activity of interest within one or more second video frames 112 of the second plurality of video frames 112 is determined. Then a second activity of interest video clip 190 is generated from the one or more second video frames 112 and the second activity of interest video clip 190 is displayed within the first carousel 610 on the display device 580. The second activity of interest video clip 190 is configured to rotate around the first axis 612 within the first carousel 610 on the display device 580.

The method 800 may yet further include that a second video camera 110 captures a second plurality of video frames 112 of the first area 101 at a second time. The second plurality of video frames 112 is analyzed or one or more second alarms are received, and then a second activity of interest within one or more second video frames 112 of the second plurality of video frames 112 is determined. A second activity of interest video clip 190 is generated from the one or more second video frames 112 and the second activity of interest video clip 190 is displayed within the first carousel 610 on the display device 580. The second activity of interest video clip 190 is configured to rotate around the first axis 612 within the first carousel 610 on the display device 580.

The method 800 may yet further include that a first thumbnail 192 associated with the first activity of interest video clip 190 is generated and the first activity of interest video clip 190 is displayed within the first carousel 610 as the first thumbnail 192 on a display device 580. A rotate manual input from the input device 570 to rotate the first thumbnail 192 to a rough center 602 of the display device 580 is received, the first thumbnail 192 is rotated to a rough center 602, and a size of the first thumbnail 192 is enlarged as the first thumbnail 192 rotates to the rough center 602. The size of the first thumbnail 192 is at a maximum at the rough center 602.

The method 800 may yet further include that a first thumbnail 192 associated with the first activity of interest video clip 190 is generated and the first activity of interest video clip 190 is displayed within the first carousel 610 as the first thumbnail 192 on a display device 580. A rotate manual input from the input device 570 is received to rotate the first thumbnail 192 away from a rough center 602 of the display device 580, the thumbnail is rotated away from the rough center 602, and a size of the first thumbnail 192 is decreased as the first thumbnail 192 rotates away from the rough center 602. The size of the first thumbnail 192 is at a maximum at the rough center 602.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for analyzing and displaying surveillance video, the method comprising:
capturing, using a first video camera, a first plurality of video frames of a first area at a first time;
analyzing the first plurality of video frames or linking to one or more alarms received;
determining a first activity of interest within one or more first video frames of the first plurality of video frames;
generating a first activity of interest video clip from the one or more first video frames;
displaying the first activity of interest video clip as a first thumbnail within a first carousel on a display device, wherein the first activity of interest video clip is configured to rotate around a first axis with a first user input within the first carousel on the display device;
capturing, using a second video camera, a second plurality of video frames of at least a portion of the first area at the first time;
analyzing the second plurality of video frames or linking to one or more second alarms received;
determining that the first activity of interest is within one or more second video frames of the second plurality of video frames;
generating a second activity of interest video clip from the one or more second video frames; and
displaying the second activity of interest video clip as a second thumbnail within a second carousel on the display device, wherein the second activity of interest video clip is configured to rotate around a second axis perpendicular to the first axis with a second user input within the second carousel on the display device.

2. The method of claim 1, further comprising:
receiving a play manual input from an input device indicating to play the first activity of interest video clip; and
playing the first activity of interest video clip on the display device in response to the play manual input.

3. The method of claim 1, further comprising:
receiving a rotate manual input from an input device to rotate the first thumbnail to a rough center of the display device;
rotating the first thumbnail to the rough center of the display device in response to the rotate manual input; and
playing the first activity of interest video clip on the display device in response to the rotate manual input.

4. The method of claim 1, wherein the first axis is a vertical axis.

5. The method of claim 1, wherein the second axis is a horizontal axis.

6. The method of claim 1, wherein the first axis is a vertical axis and the second axis is a horizontal axis perpendicular to the first axis.

7. The method of claim 1, further comprising:
capturing, using the first video camera, a second plurality of video frames of the first area at a second time;
analyzing the second plurality of video frames or linking to one or more second alarms received;
determining a second activity of interest within one or more second video frames of the second plurality of video frames;

generating a second activity of interest video clip from the one or more second video frames; and displaying the second activity of interest video clip within the first carousel on the display device, wherein the second activity of interest video clip is configured to rotate around the first axis within the first carousel on the display device.

8. The method of claim 1, further comprising:

capturing, using the second video camera, the second plurality of video frames of the first area at a second time;

analyzing the second plurality of video frames or linking to one or more second alarms received;

determining a second activity of interest within one or more second video frames of the second plurality of video frames;

generating a second activity of interest video clip from the one or more second video frames; and displaying the second activity of interest video clip within the first carousel on the display device, wherein the second activity of interest video clip is configured to rotate around the first axis within the first carousel on the display device.

9. The method of claim 1, further comprising:

generating a first thumbnail associated with the first activity of interest video clip;

displaying the first activity of interest video clip within the first carousel as the first thumbnail on the display device;

receiving a rotate manual input from an input device to rotate the first thumbnail to a rough center of the display device;

rotating the first thumbnail to the rough center of the display device in response to the rotate manual input; and enlarging a size of the first thumbnail as the first thumbnail rotates to the rough center, wherein the size of the first thumbnail is at a maximum at the rough center.

10. The method of claim 1, further comprising:

generating a first thumbnail associated with the first activity of interest video clip;

displaying the first activity of interest video clip within the first carousel as the first thumbnail on the display device;

receiving a rotate manual input from an input device to rotate the first thumbnail away from a rough center of the display device;

rotating the first thumbnail away from the rough center of the display device in response to the rotate manual input; and decreasing a size of the first thumbnail as the first thumbnail rotates away from the rough center, wherein the size of the first thumbnail is at a maximum at the rough center.

11. A video management system for analyzing and displaying surveillance video, the video management system comprising:

a processor; and a memory comprising computer-executable instructions that, when executed by the processor, cause the processor to perform operations, the operations comprising:

capturing, using a first video camera, a first plurality of video frames of a first area at a first time;

analyzing the first plurality of video frames or linking to one or more alarms received;

determining a first activity of interest within one or more first video frames of the first plurality of video frames;

generating a first activity of interest video clip from the one or more first video frames;

displaying the first activity of interest video clip as a first thumbnail within a first carousel on a display device, wherein the first activity of interest video clip is configured to rotate around a first axis with a first user input within the first carousel on the display device;

capturing, using a second video camera, a second plurality of video frames of at least a portion of the first area at the first time;

analyzing the second plurality of video frames or linking to one or more second alarms received;

determining that the first activity of interest is within one or more second video frames of the second plurality of video frames;

generating a second activity of interest video clip from the one or more second video frames; and displaying the second activity of interest video clip as a second thumbnail within a second carousel on the display device, wherein the second activity of interest video clip is configured to rotate around a second axis perpendicular to the first axis with a second user input within the second carousel on the display device.

12. The video management system of claim 11, wherein the operations further comprise:

receiving a play manual input from an input device indicating to play the first activity of interest video clip; and playing the first activity of interest video clip on the display device in response to the play manual input from the input device indicating to play the first activity of interest video clip.

13. The video management system of claim 11, wherein the operations further comprise:

receiving a rotate manual input from an input device to rotate the first thumbnail to the rough center of the display device;

rotating the first thumbnail to the rough center of the display device in response to the rotate manual input; and playing the first activity of interest video clip on the display device in response to the rotate manual input.

14. The video management system of claim 11, wherein the first axis is a vertical axis.

15. The video management system of claim 11, wherein the second axis is a horizontal axis.

16. A computer program product tangibly embodied on a non-transitory computer readable medium, the computer program product including instructions that, when executed by a processor, cause the processor to perform operations comprising:

capturing, using a first video camera, a first plurality of video frames of a first area at a first time;

analyzing the first plurality of video frames or linking to one or more alarms received; determining a first activity of interest within one or more first video frames of the first plurality of video frames;

generating a first activity of interest video clip from the one or more first video frames;

displaying the first activity of interest video clip as a first thumbnail within a first carousel on a display device, wherein the first activity of interest video clip is configured to rotate around a first axis within the first carousel on the display device;

capturing, using a second video camera, a second plurality of video frames of at least a portion of the first area at the first time;
analyzing the second plurality of video frames or linking to one or more second alarms received;
determining that the first activity of interest is within one or more second video frames of the second plurality of video frames;
generating a second activity of interest video clip from the one or more second video frames; and
displaying the second activity of interest video clip as a second thumbnail within a second carousel on the display device, wherein the second activity of interest video clip is configured to rotate around a second axis perpendicular to the first axis with a second user input within the second carousel on the display device.

\* \* \* \* \*